Oct. 26, 1926.
J. J. KANE
1,604,415
ELECTRIC POWER SYSTEM
Original Filed Jan. 17, 1920
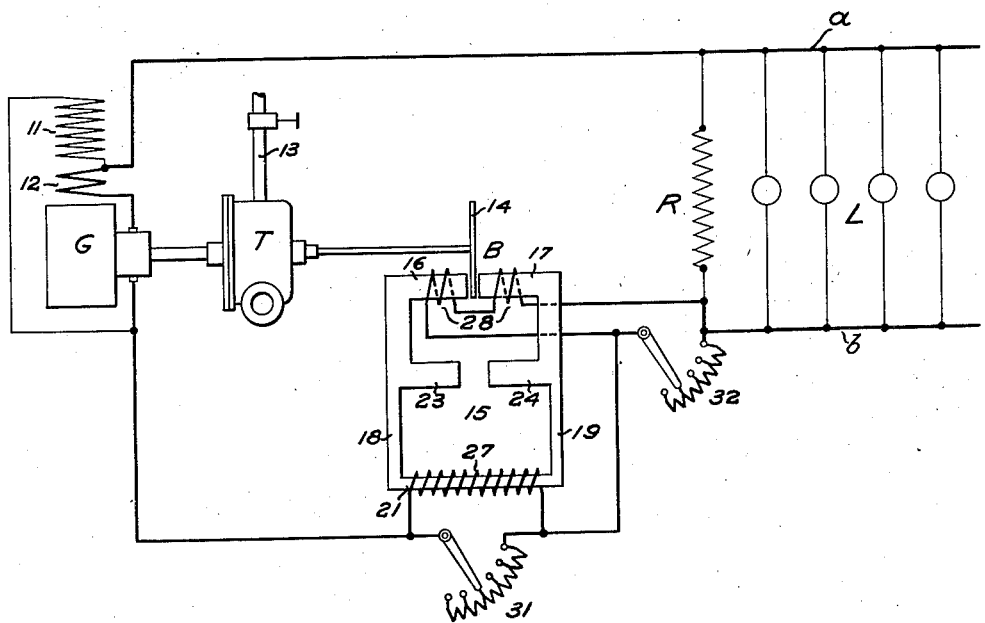

Patented Oct. 26, 1926.

1,604,415

UNITED STATES PATENT OFFICE.

JOHN J. KANE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ELECTRIC POWER SYSTEM.

Application filed January 17, 1920, Serial No. 352,614. Renewed March 19, 1925.

This invention relates in general to electrical distribution systems, and has particular relation to devices or apparatus for regulating generators connected to supply variable loads, especially where there is a tendency for the generator-driving means to operate at a speed dependent upon the load.

In certain installations, as where a steam turbine drives a generator, usually through a direct connection therewith, for supplying a variable electrical load, such as lamps on a railroad train or the locomotive thereof, some means are desirable for regulating or limiting the speed of the turbine on the loss of a portion of the generator load. It will be obvious that, if the generator were permitted to operate at an increased speed on the removal of a portion of its normal load the voltage on the lamps or other translating devices constituting the load on the generator might rise to a dangerously high value, and this is especially the case where the load comprises lamps of the incandescent type where a voltage variation of less than 10% may be highly injurious to the life of the lamps.

In accordance with this invention, improved means are provided for regulating the output of the generator, the object of the regulating means provided being to maintain a characteristic, such as the voltage, of the energy supplied by the generator substantially constant independently of the speed thereof or of any tendency of the prime-mover driving the generator to operate at a variable speed dependent upon the load on the generator; and to provide for this regulating purpose an artificial load which takes the place of all or a portion of the electrical load removed from the generator circuit. This regulation is effected in response to variations in the electrical load on the generator, the same being the most proximate and direct and quickest acting means for securing the desired regulation.

It is an object of this invention to provide a system of distribution comprising a generator supplying a load of a variable character, and improved means for maintaining the voltage of said generator substantially constant or within desired limits independently of the load on the generator.

It is a further object of this invention to provide a system of distribution comprising a generator driven by fluid-operated means, which automatically tends to increase in speed on loss of load, and supplying a load of variable character, and improved means for maintaining the voltage of the generator substantially constant or within desired limits independently of the load on the generator.

It is a further object of this invention to provide for a system of the character described an improved regulating device comprising an electrically operative brake for the shaft of the generator which is capable of exercising variable braking effects upon the shaft in response to the current supplied by the generator.

These and other objects and advantages are attained by this invention, the various novel features of which will appear from the description and drawings, disclosing one embodiment of such invention, and will be particularly pointed out in the claims.

In the accompanying drawing there is shown a diagrammatic view of a system embodying features of this invention.

In the embodiment of the invention disclosed, a generator G, shown diagrammatically, is driven by a prime mover such as a steam turbine T, being preferably mounted on the same shaft, as indicated. The shunt field of the generator is indicated at 11 and the series field at 12, the machine terminals being properly connected to the distribution circuit $a$, $b$, which supplies a number of elements of a variable load L, which may be considered as a lamp load. The turbine T is provided with an inlet 13 of adjustable size, although, in the ordinary operation of the system, the inlet opening remains constant when once adjusted, this adjustment depending upon the normal generator speed desired and the working pressure of the fluid at the turbine inlet, this pressure being considered as being maintained substantially constant, as by means of a reducing valve, or otherwise. A brake B is provided which is designed to act as an artificial load on the turbine, this brake comprising a disk 14 of conductive material which is preferably mounted on the same shaft as the generator G and turbine T and is rotatable between the poles of an electromagnet 15.

This magnet 15 is here shown as comprising alined arms or polar pieces 16 and 17 spaced apart to provide an air gap of relatively small reluctance between the opposed pole faces and in which the disk 14 is rotatable. The polar pieces 16 and 17 are connected to side arms or pieces 18 and 19, respectively, a cross arm 21 connecting these side arms. It will be apparent that, with the elements of the magnet described, magnetic flux generated in the cross arm 21 will circulate in the magnet through the arms 18 and 19 and across the air-gap between the polar pieces 16 and 17. Depending upon the intensity of the flux passing across the air-gap between the polar pieces 16 and 17, a retarding or braking effect of variable intensity is exerted upon the disk 14 due to the development of eddy currents within the conductive disk by the magnetic flux passing across the air-gap. It will be obvious that the intensity of these induced eddy currents and the consequent retarding or braking effect upon the disk 14 due thereto vary as the intensity of the magnetic flux across the air-gap between the pole faces of the polar pieces 16 and 17.

At a point intermediate between the polar pieces 16 and 17 and the cross arm 21, the side arms 18 and 19 are provided with alined arms 23 and 24, respectively, separated by a comparatively large air-gap, so as to constitute a leakage path of comparatively great reluctance between the side arms 18 and 19. With this design and construction, that is, with the air-gap between the polar pieces 16 and 17 of relatively little reluctance compared with the gap between the arms 23 and 24, it will be apparent that, under ordinary circumstances, flux generated in the cross arm 21 will pass through the arms 16 and 17 in preference to crossing the gap between the arms 23 and 24, and this effect will always be present unless there is some phenomena to hinder or prevent this normal effect.

The cross arm 21 is provided with a winding 27 in series with one side of the circuit a, b and the polar arms or pieces 16 and 17 are provided with a winding 28 in series with the winding 27. The winding 28 is so wound as to produce flux in the side arms 18 and 19 which is in a direction to oppose the flux produced by the winding 27. 31 and 32 indicate variable resistances in shunt to the windings 27 and 28, respectively, through the use of which the ampere turns of the two windings may be varied.

A permanent resistance R is connected across the circuit a, b between the winding 28 and the first increment of the lamp load or other translating devices.

The number of turns in the winding 27 and the area of cross-section of the cross arm 21 and of the adjacent parts of the side arms 18 and 19 are so selected that when there is no lamp load on the generator, that is, when the circuit thereof is closed only through the permanent resistance R, which may have a value corresponding to one or more increments of lamp load, the cross arm 21 is magnetically saturated, that is, any increase in the number of ampere turns of the winding 27 is ineffective to produce any appreciable increase in the magnetic flux in this element of the magnet. The arms 16 and 17 and 23 and 24 are preferably of such size as not to become magnetically saturated under any conditions of ordinary operation of the system. However, the winding 28 has a comparatively small number of ampere turns, and hence, under the above condition of minimum or no lamp load, this winding is effective to produce a certain minimum flux opposed to that produced by the winding 27, thus cutting down the resultant flux through the disk 14 due to the winding 21. As one or more increments of lamp load are thrown upon the circuit, it will be apparent that the current in the windings 27 and 28 increases correspondingly, but, due to the saturation of the cross arm 21, there is no appreciable increase in flux due to the winding 27, while, due to the unsaturated condition of the arms 16 and 17, the winding 28 is effective to produce a greater flux opposing that produced by the winding 27. This condition of variable opposing magnetic flux produced by the winding 28 continues up to normal or maximum load on the generator, at which time, with proper design of the elements of the system, the flux produced by the winding 28 is approximately equal and opposite to that produced by the winding 27 in the polar pieces 16 and 17, the result being that there is substantially no effective flux passing across the air-gap between the pole faces of the arms 16 and 17, and hence, no appreciable braking effect is exercised upon the disk 14 of the brake. With proper design of the magnet 15 as to the normal flux path and the leakage path through the arms 23 and 24, the required number of ampere turns in the winding 28 may be reduced to a minimum for effecting the desired neutralizing or bucking effect.

It will be apparent that, with the arrangement described above, it is insured that, with minimum load on the generator, the brake B exerts maximum braking effect on the turbine T, and, with maximum load on the generator, the brake B exerts minimum effect upon the turbine. Hence, by proper design of the brake B, this variation in braking effect can readily be made equal to the variation in electrical load upon the generator, so that, as increments of generator load are removed, equal increments of brake load are substituted to thus maintain a constant load on the turbine and avoid the effects of its inherent tendency to speed up and thus increase the voltage of the generator.

It will be apparent that, in case of heavy overload or short circuit, the winding 28 is effective to establish an effective resultant field in the opposite direction through the polar pieces 16 and 17, this effect causing the exertion of a braking effect on the disk 14 and the turbine T, and thus causing a reduction of the speed and voltage, and holding the current to a relatively safe value.

It should be understood that it is not desired that the invention claimed be limited to the exact details of construction or to use in the particular embodiment or form shown and described, for obvious modifications and other uses will occur to persons skilled in the art.

It is claimed and desired to secure by Letters Patent:

1. A generator connected to supply energy to a variable load, means for driving said generator, the speed of said driving means tending to vary with variation in the load on said generator, and means for controlling the speed of said driving means, said controlling means comprising a disk of conductive material mechanically connected to the shaft of said generator, means for producing a magnetic field through said disk including an energizing winding carrying current that varies as the load current, and means responsive to variations in the load on said generator for causing the intensity of said field to vary inversely as said load.

2. In combination, an electric generator, a supply circuit connected thereto, a variable load for said supply circuit, and a variable magnetic drag for said generator comprising a magnetizable field element, and a plurality of differentially connected windings therefor, each of said windings carrying current that varies directly as the current supplied by said generator, and said magnetic drag including means for insuring that the relation between the current in one of said windings and the magnetic effects produced thereby shall be different from the relation between the current in another of said windings and the magnetic effects produced thereby under conditions of substantial variation in the load on said generator.

3. In combination, an electric generator, a supply circuit connected thereto, a variable load for said supply circuit, and means for maintaining the voltage of said generator substantially constant, said means comprising a variable magnetic drag for the generator including a plurality of differentially connected windings responsive to the current supplied by said generator, and said magnetic drag including means for causing the relation between the current in one of said windings and the magnetic effects produced thereby to be different from the relation between the current in another of said windings and the magnetic effects produced thereby under conditions of substantial variation in the load on said generator.

4. In combination, a turbo-generator set comprising a turbine, a generator directly connected to the shaft of said turbine, a supply circuit connected to said generator, a variable working load for said supply circuit, and means for applying to the shaft of said generator an artificial load which varies inversely as the working load upon said generator, said means comprising an electromagnetically responsive drag including a magnetizable element and an energizing winding therefor, the entire energizing winding for said magnetizable element being connected in series relation with said supply circuit.

5. In combination, an engine, a generator driven thereby and adapted to supply a variable load, and means for maintaining substantially constant voltage on the load supplied by said generator in spite of variations in speed thereof, said means comprising electromagnetically responsive instrumentalities including a magnetizable element and an energizing winding therefor, said winding constituting substantially the entire energizing means for said magnetizable element and comprising differentially arranged winding sections in series relation to the generator circuit.

6. In combination, a generator, means for driving said generator, and a brake associated with said generator-driving means and comprising a disk of conductive material mechanically connected to the shaft of said generator-driving means, and means for producing a magnetic field to be cut by said disk, said latter means comprising a field element of magnetic material, and energizing means for said field element, the entire energizing means being adapted to carry current that varies directly as the current supplied by said generator, and said magnetic field-producing means including means for causing the intensity of the magnetic field cut by said disk to vary inversely as the load on said generator.

7. In combination, a generator, means for driving said generator, and an electromagnetic brake associated with said generator and comprising a field element and a disk of conductive material co-operable therewith and rotatable with said generator, and separate windings for said field element in series with the circuit of said generator and constituting the only substantial energizing means for said field element, and said field element including means whereby said windings are effective to produce a magnetic field through said disk that varies inversely as the load on said generator.

8. In combination, an electric generator, a variable load circuit connected thereto, and means for limiting both the voltage and the current of said load circuit, said means comprising an electromagnetic brake including energizing windings in series with the load circuit, and said brake being operated by two opositely directed fluxes produced by said windings and neutralizing each other under normal full load conditions.

9. In combination, an electric generator, a system of variable useful load requirements supplied by said generator, and means for maintaining substantially constant voltage on said system, said means comprising an electromagnetically operated brake mechanically associated with said generator and comprising a magnetic circuit and energizing windings therefor, said windings being in the form of differentially connected windings in series with the generator circuit, and means for insuring the production by said brake of minimum braking effect under conditions of substantially normal or full load on the generator and a braking effect which increases as the load of said system decreases.

10. In combination, an electric generator, a plurality of load devices connectible in parallel with the generator, and an electromagnetic drag brake for the generator comprising a magnetizable member, and a series connected magnetic winding therefor, and a bucking winding carrying current which varies directly as the current in the circuit of said generator and arranged to neutralize the magnetic effect of the first winding under normal full load conditions, and a disk of conductive material mounted upon the generator shaft within the magnetic influence of said magnetizing windings.

11. In combination, a generator connected to supply a variable useful load, and means for controlling said generator comprising a resistance path through which the generator circuit is closed upon removal of the load from said generator, and an electromagnetic brake associated with said generator and operative to exercise variable retarding effects, said brake comprising an energizing winding including differentially connected series windings, and means for causing said brake to exercise maximum retarding effect on the occurrence of no useful load on said generator and minimum retarding effect on the occurernce of full useful load on said generator.

12. In combination, a generator connectible to supply a variable load, a conducting disk rotatable in unison with the rotor of said generator, an electromagnetic circuit having an air-gap in which said disk is rotatable, and a winding connected to the circuit of said generator for energizing said magnetic circuit, a portion of the normal magnetic path of said magnet being of reduced cross-sectional area and magnetically saturable by said winding under conditions corresponding to less than full load upon said generator.

13. In combination, an electric generator, and an electromagnetic brake comprising a disk of conductive material mechanically associated with said generator, and a field element for said disk comprising an element of magnetizable material, and an energizing winding therefor connected to the circuit of said generator, the normal magnetic path of said magnetizable element being saturable by said winding under conditions corresponding to less than full load upon said generator, and a portion of said magnetizable element immediately associated with said conductive disk being non-saturable magnetically under any ordinary condition of load upon said generator.

14. In combination, an electric generator, and an electromagnetic brake comprising a rotatable element, and a relatively stationary field element of magnetizable material comprising portions magnetically in series in the normal magnetic circuit of said element and magnetically saturable by different amounts of magnetic flux, the portion least readily saturable being directly associated with said rotatable element, and energizing means for said field element operative to cause the effective flux in said least readily saturable portion to vary inversely as the load on said generator.

15. In combination, a generator, driving means therefor, and a brake associated with said generator-driving means and comprising a conductive disk rotatable between poles of an electromagnet, said electromagnet comprising a flux-producing portion of reduced cross-sectional area, and parallel return paths for flux produced in said first portion, one of said paths having an air-gap within which said conductive disk is rotatable, and energizing means for said electromagnet responsive to the load upon said generator for causing the effective flux across said air-gap to vary in response to the load upon said generator.

16. In a system of control, a prime mover, a generator actuated thereby and connectible to supply a variable load, and an electromagnetic brake associated with said generator and said prime mover, said brake comprising a conductive disk and an energizing magnet therefor, said magnet comprising portions magnetically in series in the normal magnetic circuit of the magnet and of different cross-sectional areas whereby saturation of one portion may occur before saturation of another, a winding for energizing said portion of reduced cross-sectional area, and a second winding arranged to produce flux opposing that of said first winding in said portion of greater cross-sectional area.

17. In a system of control, a generator supplying a variable load, a resistance path through which said generator circuit is closed upon removal of the load from said generator, and a brake for exercising variable retarding effects upon said generator shaft, said brake comprising a conductive disk associated with said generator, and means for producing a variable magnetic flux cutting said disk, said means comprising an electromagnet having a flux-producing portion of reduced cross-sectional area, and parallel return paths for flux produced in said first mentioned portion, said parallel paths being provided with air-gaps of different reluctance, and said conductive disk being rotatable in the air-gap of minimum reluctance, and energizing means for said electromagnet operative to cause the effective flux across the air-gap of minimum reluctance to vary inversely as the load upon said generator.

18. In combination, a generator operative to supply a power circuit, and means for controlling a characteristic of the electrical energy in the said power circuit, said controlling means comprising a conductive disk, and means for producing magnetic flux through said disk, said flux-producing means including a magnetic circuit with which said conductive disk is operatively associated, and energizing windings for said magnetic circuit in the form of differentially connected windings in series with the generator circuit, said flux producing means having a flux-producing effect on said disk which is a minimum when the current supplied to said power circuit is of normal full load value and which is a maximum when said current is of minimum value.

19. In combination, an electrical power circuit, means for supplying current thereto, and a controlling device associated with said power circuit and comprising a conductive disk, and an electromagnetic device for producing magnetic flux through said disk and including a magnetic circuit having a gap portion with which said conductive disk is operatively associated, and differentially connected energizing windings for said magnetic circuit carrying current proportional to that supplied to said power circuit under normal conditions, said electromagnetic device under normal conditions causing no appreciable flux to cut said disk and under abnormal conditions causing an increased flux to cut said disk.

20. In combination, an electrical power circuit, means for supplying energy thereto, and a controlling device comprising a magnetic circuit having an air-gap, and a plurality of differentially connected energizing windings for said magnetic circuit carrying current proportional to that supplied to said power circuit under normal conditions, and a conductive disk subjected to flux across the gap in said magnetic circuit, said controlling device being operated by two oppositely directed fluxes produced in said magnetic circuit by said windings and neutralizing each other under conditions of normal current supply to said circuit.

21. In combination, an electrical circuit, means for supplying current thereto, and a controlling device associated with said circuit and comprising an electromagnetic device including a movable element, a magnetic circuit, said movable element being electromagnetically responsive only to the effective flux in a portion of said magnetic circuit, and energizing windings for said magnetic circuit in the form of differentially connected windings carrying current proportional to that supplied to said electrical circuit, said electromagnetic device including means for insuring the production of no appreciable flux through said movable element under conditions of normal current supply to said electrical circuit and the production of a substantial increase in said flux under conditions of abnormal current supply to said electrical circuit.

22. In combination, an electrical power circuit, means for supplying current thereto, and an electromagnetically responsive controlling device comprising a magnetic circuit having an air-gap, a conductive disk rotatable in said air-gap, and differentially connected, series energizing windings for said magnetic circuit carrying current proportional to that furnished by said supply means to said power circuit under normal conditions, said controlling device being effective to produce a minimum of effective flux through said disk under conditions of normal current flow between said supply means and said power circuit and to produce increased flux through said disk and cause a substantial torque to be exerted on said disk under abnormal conditions of said current flow.

23. In combination, an electrical power circuit, a source of supply for said power circuit, and means for controlling the electrical energy supplied by said source, said control means comprising a movable element, and an electromagnetic flux-producing device operative to cause the exertion of appreciable efforts upon said movable element only under conditions of abnormal current flow between said source and said power circuit, said magnetic circuit having a portion of increased reluctance, and said movable element being electromagnetically responsive only to the effective flux in said portion of increased reluctance, and differentially connected energizing windings for said magnetic circuit carrying current proportional to that supplied to said power circuit.

24. In combination, a source of supply of electrical energy, a power circuit connected to said source, and controlling apparatus associated with said source and said power circuit for exercising a controlling effect on the electrical energy thereof, said controlling apparatus comprising a magnetizable element having a portion of increased reluctance, and a flux-producing portion magnetically saturable during normal operation, a movable element electromagnetically associated with said portion of increased reluctance and responsive to torque effects produced thereon, and differentially connected energizing windings for said magnetizable element, one of said windings being directly associated with said saturable portion and another of said windings being directly associated with said portion of increased reluctance.

25. In combination, an electrical power circuit of variable load requirements, means for supplying electrical energy to said power circuit, and controlling means associated with said supply means and said load circuit and comprising a magnetic field element having an air-gap, a conductive disk subjected to flux across said air-gap, and a plurality of differentially arranged energizing windings for said magnetic circuit carrying current proportional to that supplied to said power circuit, said controlling means being operative under normal operating conditions to cause the production of substantially no effective flux across said conductive disk and on the occurrence of abnormal operating conditions to cause an increase in the flux through said disk and the exertion of effective torque on said conductive disk for controlling purposes.

26. In combination with an electrical power circuit, a controlling device therefor comprising a magnetizable field element having spaced polar portions providing an air-gap, an element movable in said air-gap, said field element comprising a plurality of flux-producing portions one of which is more readily saturable than another, said portions being magnetically in series in the normal magnetic circuit through said air-gap, and one of said paths including said air-gap, and energizing means for said field element including a plurality of winding sections carrying current proportional to that in said electrical circuit and differentially arranged on said field element with one of said winding sections immediately associated with the more readily saturable portion of said field element, whereby the effective flux across said air-gap is caused to vary inversely as the load on said circuit throughout a certain range of load variation.

27. In combination, a generator, and means associated therewith for controlling a characteristic of the current in the circuit of said generator, said controlling means including differentially connected energizing windings carrying current proportional to that in the circuit of said generator, and means for causing the resultant energizing effect of said windings to be responsive to the load on said generator, with the resultant effective energization such as to exercise an inhibiting effect on the load on the generator as the current in the generator circuit exceeds a predetermined value.

In testimony whereof, the signature of the inventor is affixed hereto.

JOHN J. KANE.